United States Patent [19]

Lohrmann et al.

[11] Patent Number: 5,337,052
[45] Date of Patent: Aug. 9, 1994

[54] RANDOM BINARY MODULATED SENSOR

[75] Inventors: Dieter R. Lohrmann, Lanham, Md.; Herbert Dropkin, Washington, D.C.

[73] Assignee: The United States of America as represented by the Secretary of the Army, Washington, D.C.

[21] Appl. No.: 386,794

[22] Filed: Jul. 20, 1989

[51] Int. Cl.⁵ .............................. G01S 13/32
[52] U.S. Cl. ......................... 342/68; 342/145; 102/214
[58] Field of Search ............... 342/13, 14, 15, 16, 342/17, 68, 95, 145; 102/214

[56] References Cited

U.S. PATENT DOCUMENTS

| | | | |
|---|---|---|---|
| 3,874,296 | 4/1975 | Hedenark | 102/214 |
| 4,019,185 | 4/1977 | Morgan | 342/201 |
| 4,059,052 | 11/1977 | Karr | 102/214 |
| 4,219,818 | 8/1980 | Mansur, Jr. | 342/203 |
| 4,238,785 | 12/1980 | Hannigan | 342/458 |
| 4,604,622 | 8/1986 | Delon et al. | 342/189 |
| 4,651,647 | 3/1987 | Baker | 102/213 |
| 5,291,202 | 3/1994 | McClintock | 342/16 |

*Primary Examiner*—John B. Sotomayor
*Attorney, Agent, or Firm*—Freda L. Krosnick; Guy M. Miller

[57] ABSTRACT

A random binary modulated sensor transmits a continuous wave r.f. signal modulated by a binary random bit pair code signal which is transmitted by an antenna. A return signal reflected from a target is received by the antenna. A receiver mixer modulates the return signal with the r.f. signal and a delay circuit delays the binary random bit pair code. A coorelator receives the modulated return signal and delayed binary random bit pair code for producing a doppler output signal. A separate r.f. path in which a portion of the modulated r.f. signal is variably attenuated and variably phase shifted is present to cancel noise signals generated by antenna mismatch in transmission.

1 Claim, 4 Drawing Sheets

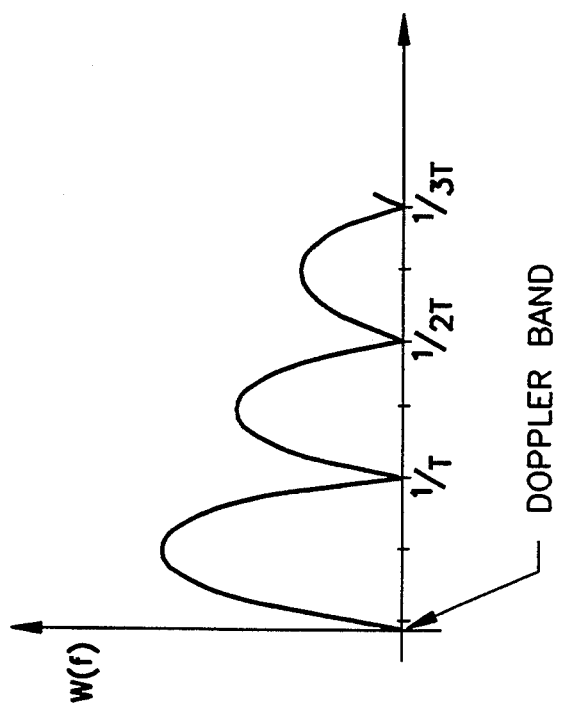

RANDOM BINARY MODULATED SENSOR

RIGHTS OF THE GOVERNMENT

The invention described herein may be manufactured, used, and licensed by and for the: United States Government for Governmental purposes without payment to us of any royalties thereon.

BACKGROUND OF THE INVENTION

1. Field of the Invention

The invention relates generally to distance sensors, and, more particularly, to a radar proximity sensor for missiles and projectiles.

2. Description of Related Art Including Information Disclosed Under §§ 1.97-1.99

(U) Radar proximity sensors using random binary phase modulation have the problem that part of the transmit signal leaks into the receiver via reflections at the antenna caused by antenna mismatch. The leakage signal is noisy due to the random noise-like modulation and is a much more powerful signal than the typical return signal reflected from a target. If the leakage sisal contains noise components which fall lute, the Doppler band, the desired signal will be desensitized.

In the past, random bit sequences have not used because of this noise problem. Only so called pseudorandom bit sequences were used, i.e., bit patterns that repeat. Then the noise contains only spectral lines that are multiples of the pattern repetition rate and can be made to fall outside the Doppler spectrum.

Unfortunately, a pseudorandom binary bit sequence: can be recovered and utilized to create interference signals to frustrate the purpose of the proximity sensor, e.g., to prefire a proximity fuze of an artilliary projectile.

SUMMARY OF THE INVENTION (U) Therefore, it is a primary object of the invention to provide a radar proximity sensor with a truly random binary modulation sequence and noise reduction circuitry.

(C) In the preferred embodiment of the invention, this object is achieved in three ways: (1) Part of the signal being supplied to the antenna is diverted to a parallel path and then recombined with the return signal from the antenna such that it nullifies most of the noise signal caused by antenna mismatch; (2) the random binary modulation sequence is a random binary bit pair modulation sequence; and (3) the reference random bit pair signal for determining the distance setting when correlated with the return signal is adjusted in steps such that it is shifted from the noise signal reflected from the antenna by 2N bits, where N is an arbitary whole number.

BRIEF DESCRIPTION OF THE DRAWINGS

The invention will be better understood, and further objects, features, and advantages thereof will become more apparent from the following description of the preferred embodiment, taken in conjunction with the accompanying drawings in which:

FIG. 5 is a graphic representation of the noise spectrum of the binary random bit pair code; and FIG. 6 is a graphic representation of another random binary pair code formed when the random binary pair code of FIG. 3 is shifted by 2N bits, where N is a positive integer, and the shifted code is multiplied with the unshifted code.

Figure 1:
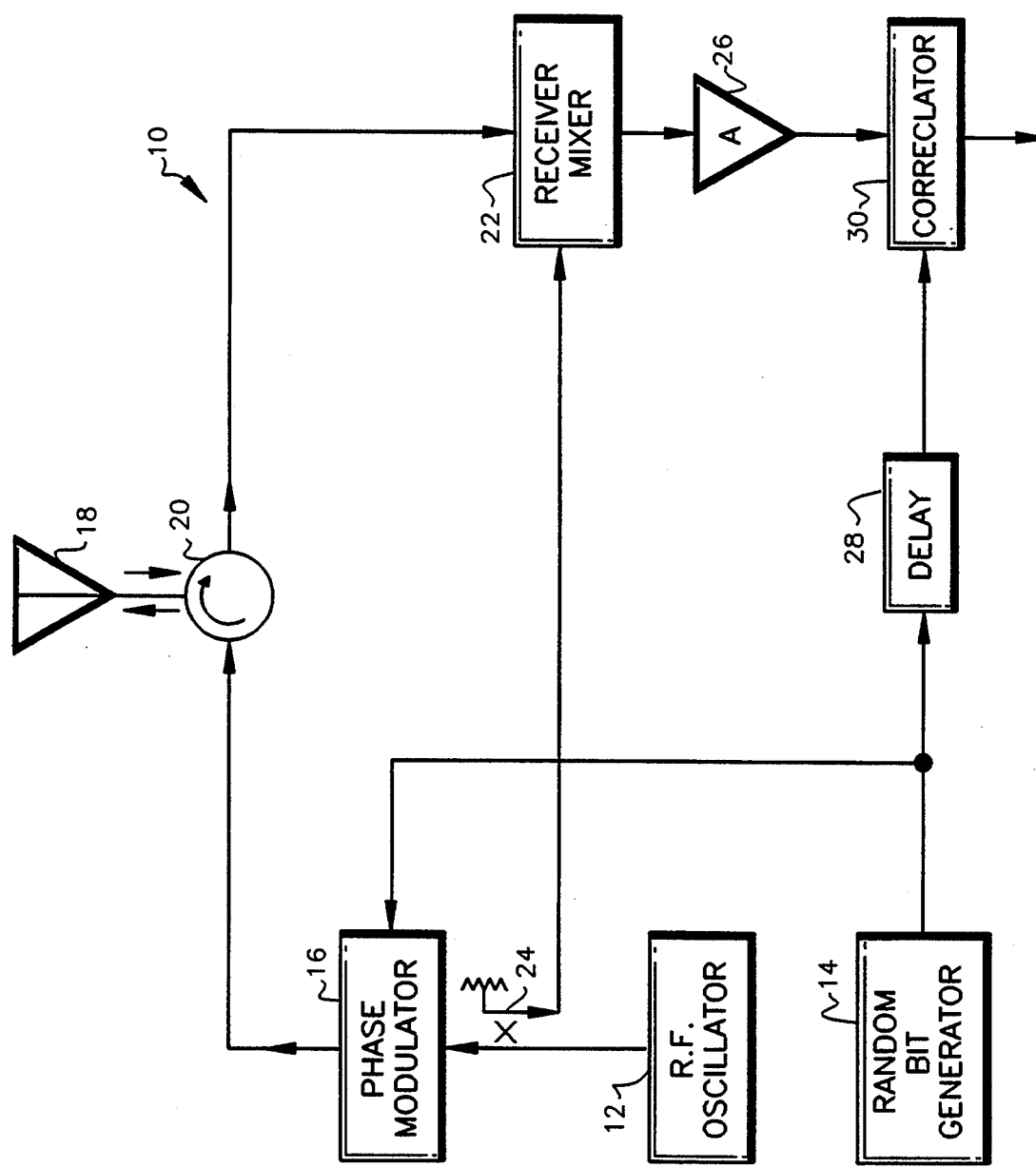
FIG. 1 is an electrical schematic of a random binary phase modulated radar proximity sensor.

DESCRIPTION OF THE PREFERRED EMBODIMENT (U) The random binary phase reversal radar proximity sensing system 10 shown in FIG. 1 includes a radio frequency (r. f.) oscillator 12 for generating a continuous wave (c. w.) r. f. signal, a random bit generator 14 for generating a random bit digital signal, and a phase modulator 16, connected to receive the c. w. r. f. signal and the random bit digital signal, for phase modulating the c. w. r. f. signal with the random bit digital signal.

(U) The system 10 also includes an antenna 18 for directing the modulated c. w. r. f. signal towards a target and for receiving the portion of the modulated c. w. r. f. signal reflected back to the antenna 18 from the target. A circulatory 20 is connected between the phase modulator 16, the antenna 18, and s receiver mixer 22, to direct the modulated c. w. r. f. signal to the antenna 18 and the return signal to the receiver mixer 22. The receiver mixer 22 receives its oscillator injection from the c. w. r. f. oscillator 12 via a directional coupler 24.

(U) The system 10 includes an amplifier 26 for amplifying the output signal of the receiver mixer 22, a variable signal delay 28 for delaying the random bit digital signal generated by the c. w. r. f. oscillator 12 by a selected time, and a correlator 30 for correlating the amplified output signal of the receiver mixer 22 and the delayed random bit digital signal generated by the random bit generator 14. In the simplest case, the correlator 30 will just be a phase reversal switch.

(U) One of the problems connected with the system 10 of FIG. 1 is the fact that a strong signal is received by the receiver mixer 22 due to reflections from the antenna 18 caused by mismatch. For a technically feasible VSWR of the antenna of 1.2, the power reflected from the antenna 18 will be 21.6 dB below the transmit power. For a transmit power of one watt, the power entering the receiver mixer 22 due to reflection at the antenna 18 will be +8.8 dBm, i.e, it will almost saturate the mixer 22, if a double balanced mixer is used. The power received from the target is typically −55 dBm, approximately 63 dB below the signal reflected at the antenna.

(U) If the return signal caused by antenna mismatch contains noise components which fall into the Doppler band, the desired signal will be desensitized.

(U) Therefore, in the past only pseudo-random bit sequences were used, i.e., bit patterns that repeat. Then, the noise contains only spectral lines that are multiples of the pattern repetition rate and can be made to fall outside the Doppler spectrum. For example, if it is assumed that the bit duration is 20 nanoseconds and the Doppler band from 1 kHz to 100 kHz, then in order to make the noise fall outside the Doppler band, the lowest (fundamental) pattern repetition frequency must be at least 300 kHz. Therefore, the pattern repetition time must be 1/30,000=3.3 microseconds. With a bit duration of 20 nanoseconds, the sequence must repeat after 165 bits.

(U) The disadvantage of a pseudorandom binary bit sequence is the possibility that an interferer could recover the pattern and use it for the creation of interference signals, resulting in greatly reduced power requirements for dudding, and possibly prefiring.

Figure 2:
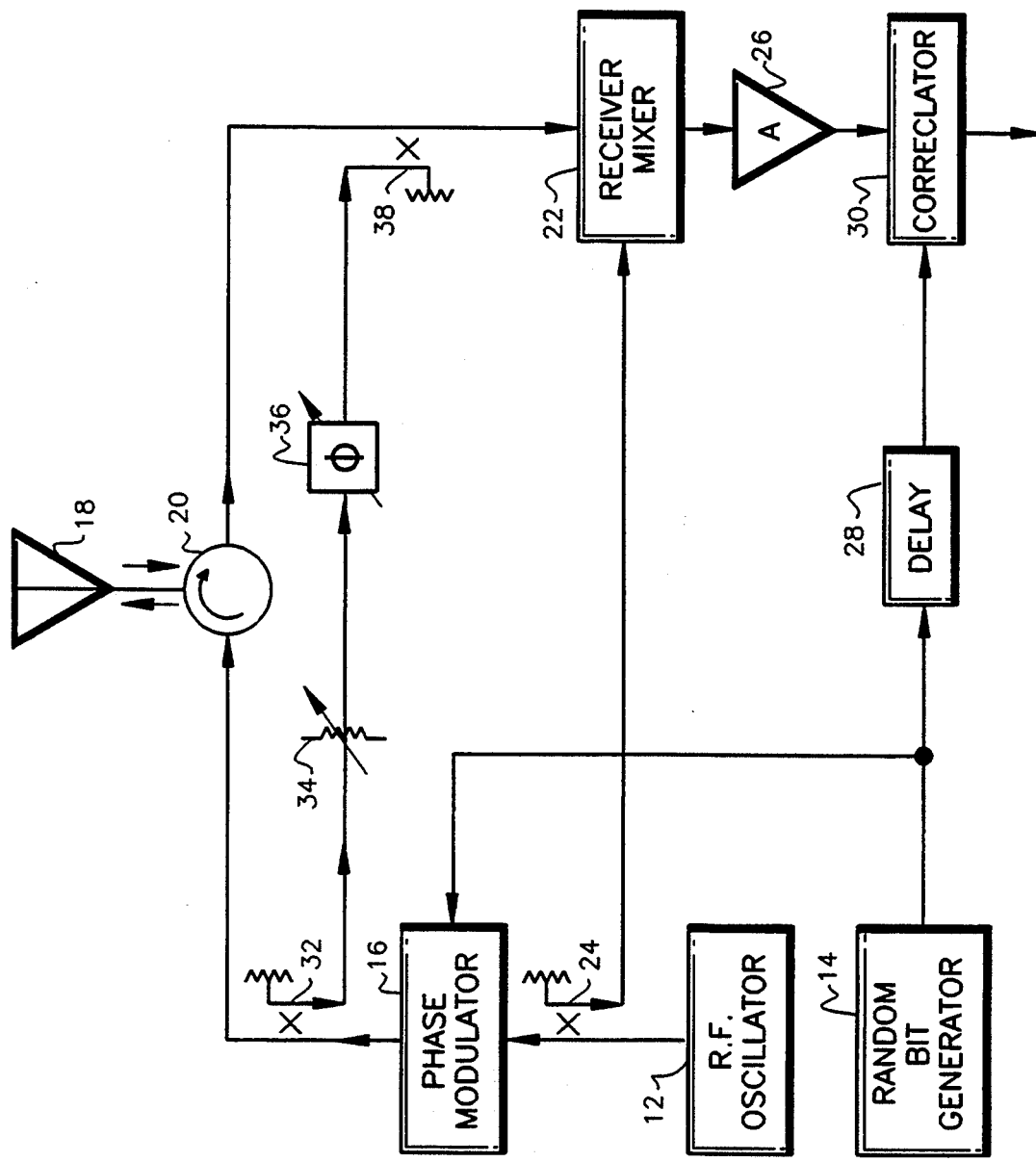
FIG. 2 is an electrical schematic of the preferred embodiment of the invention.

(U) In the preferred embodiment of the invention shown in FIG. 2, true random binary modulation is achieved and noise is reduced by a combination of three methods.

(c) The system of FIG. 2 includes a second directional coupler 32 coupled to receive a portion of the modulated output signal of the phase modulator 16 and direct this signal portion through a variable attenuator 34 and variable phase shifter 36 to a third directional coupler 38 coupled to combine this signal portion with the return signal from the antenna 18 to the receiver mixer 22. Thus, the output signal of the phase modulator 16 is divided between two parallel paths between the two directional couplers 32, 38. A portion of this signal travels along a first path from the second directional coupler 32 throught the circulator 20 to the antenna 18, then back through the circulator 20 to the third directional coupler 38. The remaining portion of this signal travels along a second path from the second directional coupler 32 through the variable attenuator 34 and the variable phase shifter 36 to the third directional coupler 38. The variable phase shifter 36 is adjusted so that the length of the first path differs from the length of the second path by one-half wavelength of the r.f. signal, and the variable attenuator is adjusted so that the amplitude of the signal in the second path is approximately the same as the amplitude of the return signal caused by antenna mismatch, so that much of the first path noise signal is cancelled by the second path signal when these signals are combined at the third directional coupler 38.

Figure 3:
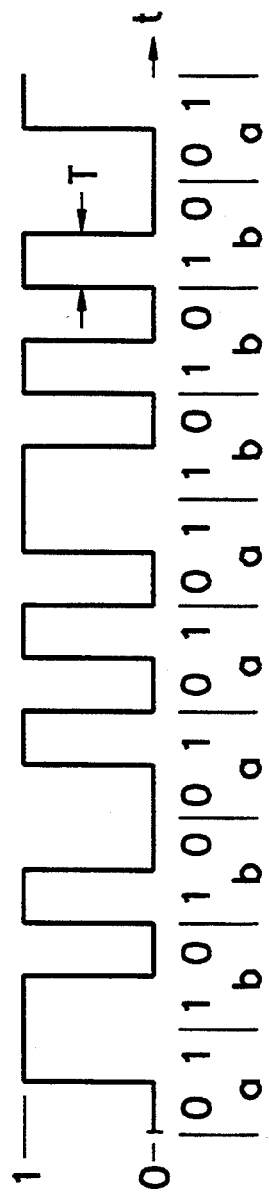
FIG. 3 is a representation of the binary random pair code utilized in the system of FIG. 2.

(C) In the preferred embodiment of FIG. 2, a binary random bit pair code is used, rather than a binary random bit code. The pair code is a random sequence of bit pairs "a" and "b". Pair "a" is a "zero" bit followed by a "one" bit, and pair "b" is a "one" bit followed by a "zero" bit with each bit having a duration T, as shown in FIG. 3.

(C) One characteristic of this binary random pair code is that the longest sequence of equal bits (either "ones" or "zeros") is two. Therefore, it is intuitively seen that the spectrum of the sequence will contain very low amplitude low frequency components, because long sequences mean long periods and mean low frequencies. Another characteristics of this pair code is the fact that sequences of two "ones" or two "zeros" are always separated by an even number of bits.

Figure 4:
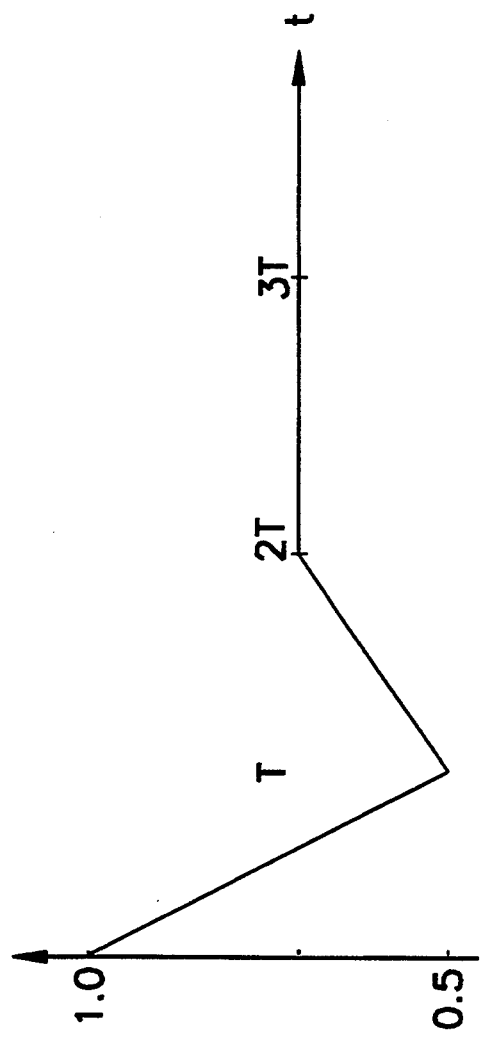
FIG. 4 is a graphic representation of the autocorrelation function of the binary random pair code.

(C) The Autocorrelation Function $\rho(\tau)$ of this binary pair code is shown in FIG. 4. The noise spectrum W(f) of the binary pair code, shown graphically in FIG. 5, is:

$$W(f) = 4T\left(\left[\frac{\text{Sin } \pi fT}{\pi fT}\right]^2 - \left[\frac{\text{Sin } 2\pi fT}{2\pi fT}\right]^2\right)$$

where f is the Doppler frequency and T is the duration of a single bit. It is seen that the binary pair code has a spectrum which has a null for low frequencies, i.e., the Doppler band. Typically, T=10 ns, I/T=100 MHz, and the Doppler band extends from 0 to 100 kHz. Therefore, any noise leaking from the delay 28 past the correlator 30 into the Doppler output will be greatly reduced due to the shape of the spectrum, as discussed above.

(C) If the random binary pair code is shifted by 2N bits, where N is a positive integer, and the shifted code is multiplied with the unshifted code, the resulting product will be another random binary pair code with sequences no longer than four "ones" or "zeros", as illustrated in FIG. 6. This fact is utilized in the third method of suppressing noise due to reflection at the common antenna in random binary phase reversal radar proximity sensors. The delay 28 is adjusted in two bit steps so that signal supplied by the delay 28 to the correlator 30 is shifted exactly 2N bits from the noise signal reflected froth the antenna 18 and also supplied to the coorelator 30. The result of multiplying these two signals in the correlator 30 is again a pair code, with pair "a" being two "ones" followed by two "zeros" (1100) and pair "b" being two "zeros" followed by two "ones" (0011). Therefore the noise spectrum resulting from multiplication of the leakage signal and the delayed code, taking place in the correlator 30, has again a null at zero frequency, i.e., close to the Doppler hand. Hence, little noise energy due to the multiplied leakage signal will fade into the Doppler band.

(U) Since there are modifications, variations and additions to the invention described herein which would be obvious to one skilled in the art, it is intended that the scope of the invention be limited only by the appended claims.

What is claimed and desired to be secured by letters patent of the United States is:

1. A random binary phase modulated sensor, which comprises:
   r. f. oscillator means for generating a continuous wave (cw) r. f. signal;
   random bit generator means for generating a binary random bit pair code signal;
   phase modulator means, connected to receive the r. f. signal and the binary code signal, for phase modulating the r.f. signal with the binary code signal;
   antenna means for transmitting the phase modulated r. f. signal toward a target and for receiving a return signal reflected from the target;
   receiver mixer means, connected to receive the return signal and the r. f. signal generated by the oscillator means for modulating the return signal with the r. f. signal;
   circulator means, connected to the phase modulator means, the antenna means, and the receiver mixer means, for directing the phase modulated r. f. signal front the phase modulator means to the antenna means and the return signal from the antenna means to the receiver mixer means;
   signal delay means, connected to receive the binary code signal generated by the random bit generator means, for delaying the binary code signal by a predetermined time;
   correlator means connected to receive the modulated return signal and the delayed binary code signal for producing a Doppler output signal;
   a first r. f. signal path from the r. f. oscillator means to the receiver mixer means via the phase modulator means and the circulator means to the antenna means and from the antenna means to the receiver mixer means via the circulator means; and
   a second r.f. signal path from the r.f. oscillator means directly to the receiver mixer means;
   wherein the length of the first r. f. signal path differs, from the length of the second r. f. signal path by one quarter of the wavelength of the r. f. signal.

* * * * *